UNITED STATES PATENT OFFICE.

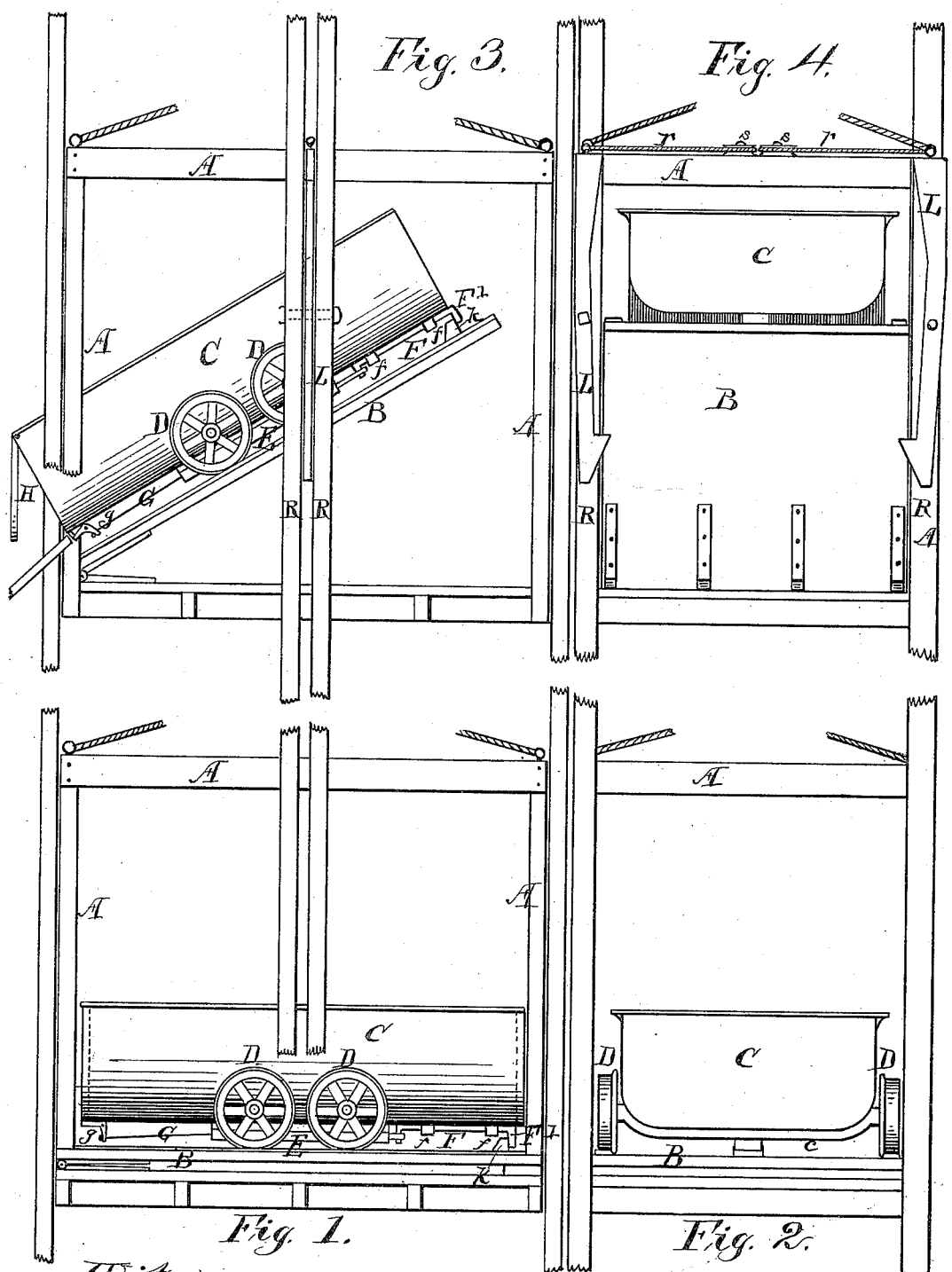

ISAAC KIRK, OF WARREN, OHIO.

SELF-DUMPING CAR AND PLATFORM FOR MINES.

SPECIFICATION forming part of Letters Patent No. 302,914, dated August 5, 1884.

Application filed January 21, 1884. (No model.)

*To all whom it may concern:*

Be it known that I, ISAAC KIRK, of Warren, in the county of Trumbull and State of Ohio, have invented certain new and useful Improvements in Self-Dumping Cars and Hoisting-Platforms for Mines, of which the following is a specification.

My improvements relate to the construction of a dumping-car to be used in mines, and to the construction and arrangement of the platform of the hoisting-cage, whereby the engineer who manipulates the hoisting machinery dumps and discharges the load of the car without removing it from the cage, and by the same power employed for hoisting.

These improvements consist of a sheet-metal body for car having a rounded bottom, and provided with an automatic spring-latching device for holding the hinged end board.

They also consist of a hinged platform and automatic lever-hook device for holding said platform up for dumping the load from the car by tilting the car and the platform together, as hereinafter fully described and claimed.

In the drawings, Figure 1 is a side elevation of the car and platform. Fig. 2 is an end elevation of the same. Fig. 3 is a side elevation of car and platform, showing them raised or tilted for dumping and discharging. Fig. 4 is an end view of the same, showing the lever-hooks in position for tilting the car.

A A represent the frame-work of the cage of a hoisting apparatus.

B is the floor of the cage, on which are laid the rails for the car C to run and stand upon. Said floor B is hinged at one end to sills or joists forming the bottom of the cage. The object of hinging the floor, as shown, is to allow the floor to be raised for dumping the car without removing the car from the platform. This cage rides in the slides of an elevator in the usual manner.

The car C is constructed of boiler-iron, having the lower corners rounded, as shown, the object being to facilitate the dumping of the load and obviate the clinging of coal-dust, as in sharp corners. The body is mounted on a simple truck composed of two bent axles, *c c*, secured to the bottom and provided with four wheels, D D. To the under side of said car is attached a strong tube, E, containing a stout spiral spring, to one end of which is attached a draw-bar, F, playing in brackets *f f*, secured to the car-bottom. Said bar F has a hooked end, F', for a purpose hereinafter shown. The other end of spring is connected by rod G to a bell-crank latch, *g*, which serves to hold the hinged end-board H of the car shut while the car is down in a horizontal position, but which will be withdrawn for unlatching when the car and platform are tilted up, as hereinafter explained.

In the side rails, R R, of the elevator are pivoted two strong hooked levers, L L, the top ends having cords *r r*, attached and passing over pulleys *s s* in the top rail of the cage, to a point convenient for the operator to handle them. The hooks on the lower ends of said levers are for catching under the side edges of the aforesaid hinged floor and holding it up for tilting the car to unload it, which is done by lowering the cage a short distance. A chute, U, is provided for receiving the load. This chute and the said lever-hooks are located at the top of the mining-shaft.

The operation of this is as follows: The car being loaded is run onto the platform, with the hook F' of the draw-bar resting against a block, K, secured to the floor. Now the hoist is made by the engineer at the top of the shaft. When the car has arrived at the top of the shaft, the upper part of the frame of the cage bears against the inclined sides on the upper ends of the levers L L. This throws the hooks on their lower ends under the edges of the floor B. Now, by slightly lowering the cage, the said floor is held by the hooks, thus tilting the car, as seen in Fig. 3. The car moves forward, but the hook F' catches against the block K, so that the car can move only a short distance, just enough to withdraw the latch *g*, which releases the end-board H, and the load slides out of the car into the chute. Then the engineer again raises the cage to let the car and floor down, and withdraws the hooks of the levers L L from under the floor. The cage, with its car, is again ready to be lowered down the shaft. As the platform again resumes its horizontal position, the spring under the car draws the car back by its tension and again locks or latches the end-gate.

Having described my invention, I claim—

1. The car C, formed from iron plate, having rounded bottom, and provided with hinged end-gate H, and setting on wheeled truck c D, the bottom of car having inclosed spring E, draw-bar F, having hook F', a connecting-rod, G, and latch g, all constructed and combined to operate substantially as described.

2. The hoisting-cage A, provided with hinged floor B and block K, in combination with the guide elevator-rails R R, having the hooked levers L L, pivoted on said rails, the levers having cords r r, for releasing them, all being arranged for holding the platform for tilting and dumping a loaded car, substantially as described.

ISAAC KIRK.

Witnesses:
  E. W. LAIRD,
  GEO. W. TIBBITTS.